(12) United States Patent
Goldblatt et al.

(10) Patent No.: US 6,723,796 B2
(45) Date of Patent: Apr. 20, 2004

(54) PROCESSES FOR PREPARING GRAFTED COPOLYMERS

(75) Inventors: Irwin L. Goldblatt, Edison, NJ (US); Richard P Sauer, North Plainfield, NJ (US)

(73) Assignee: Castrol Limited, Wiltshire (GB)

( * ) Notice: Subject to any disclaimer, the term of this patent is extended or adjusted under 35 U.S.C. 154(b) by 13 days.

(21) Appl. No.: 10/093,517

(22) Filed: Mar. 11, 2002

(65) Prior Publication Data

US 2002/0183456 A1 Dec. 5, 2002

Related U.S. Application Data

(62) Division of application No. 09/529,013, filed on Apr. 6, 2000, now Pat. No. 6,410,652.

(51) Int. Cl.⁷ .................... C08F 267/04; C08F 271/02
(52) U.S. Cl. .................... 525/279; 525/281; 525/282; 525/285; 525/263; 525/273; 525/293; 525/310
(58) Field of Search ................. 525/279, 281, 525/282, 285, 263, 273, 293, 310, 315

(56) References Cited

U.S. PATENT DOCUMENTS

| | | |
|---|---|---|
| 3,563,972 A | 2/1971 | Kowalski et al. |
| 3,593,011 A | 7/1971 | Beauxis, Jr. et al. |
| 3,608,001 A | 9/1971 | Kowalski et al. |
| 4,384,072 A | 5/1983 | Newman et al. |
| 4,483,886 A | 11/1984 | Kowalski |
| 4,486,575 A | 12/1984 | Newman et al. |
| 4,501,859 A | 2/1985 | Newman et al. |
| 4,508,592 A | 4/1985 | Kowalski |
| 4,513,116 A | 4/1985 | Kowalski et al. |
| 4,548,995 A | 10/1985 | Kowalski et al. |
| 4,554,326 A | 11/1985 | Kowalski et al. |
| 4,563,506 A | 1/1986 | Kowalski et al. |
| 4,632,963 A | 12/1986 | Gardner et al. |
| 4,703,091 A | 10/1987 | Gardner et al. |
| 4,957,974 A | 9/1990 | Bortnick. .................... 525/301 |
| 5,070,624 A | 12/1991 | Vero et al. |
| 5,087,674 A | 2/1992 | Gardner et al. |
| 5,298,565 A | 3/1994 | Lange et al. ................. 525/279 |
| 5,384,371 A | 1/1995 | Caines et al. |
| 5,424,367 A | 6/1995 | Auda et al. .................. 525/285 |
| 5,523,008 A | 6/1996 | Boden et al. ................ 525/279 |
| 5,814,586 A | 9/1998 | Boden et al. ................ 528/221 |
| 6,410,652 B1 * | 6/2002 | Goldblatt et al. ........... 525/279 |

FOREIGN PATENT DOCUMENTS

| | | |
|---|---|---|
| EP | 0 076 173 | 4/1983 |
| WO | WO 96/12746 | 5/1996 |

OTHER PUBLICATIONS

Kowalski et al, "Put melt rheology to work in your extruder", Plastics Engineering, Jun. 1974, pp. 47–51.
Kowalski et al, "Introduction to Melt Reheology and Applications to Extrusion", SPE Journal, vol. 24, Mar. 1968, pp. 47–51.
Kowalski et al, "Chemistry of Condensation Reactions Carried Out in Polymer Blends", Polym. Mater. Sci. Eng., 65,356, 1991, two sheets.
Kowalski et al, "Extruder Halogenation of Butyl Rubber", Chemical Engineering Progress, May 1998, pp. 67–73.
Lambia et al, "Reactions in molten polymers", Plastics and Rubber Processing and Applications, vol. 13, No. 2, 1990, pp. 75–79.

* cited by examiner

Primary Examiner—James J. Seidleck
Assistant Examiner—Olga Asinovsky
(74) Attorney, Agent, or Firm—Nixon & Vanderhye P.C.

(57) ABSTRACT

Methods are disclosed for making graft copolymers. The methods comprise the steps of: (a) providing (i) an ethylene/propylene (EP) copolymer or other graftable polymer, (ii) an ethylenically unsaturated sulfur-, nitrogen- and/or oxygen-containing monomer, and (iii) an amount of an initiator sufficient to graft said monomer and EP copolymer or other graftable polymer, (b) introducing said EP copolymer or other graftable polymer into an extruder; (c) introducing said monomer into the extruder; (d) introducing said initiator into the extruder, wherein at least one of the above-identified reactants in (a) is introduced in the presence of a polar solvent; and (e) reacting said EP copolymer or other graftable polymer, monomer and initiator by operating said extruder, thereby forming the graft copolymer. This invention also relates to methods of making a dispersant viscosity index improver and methods for making a lubricating oil. This invention further relates to graft copolymer products made by the aforementioned methods.

13 Claims, 1 Drawing Sheet

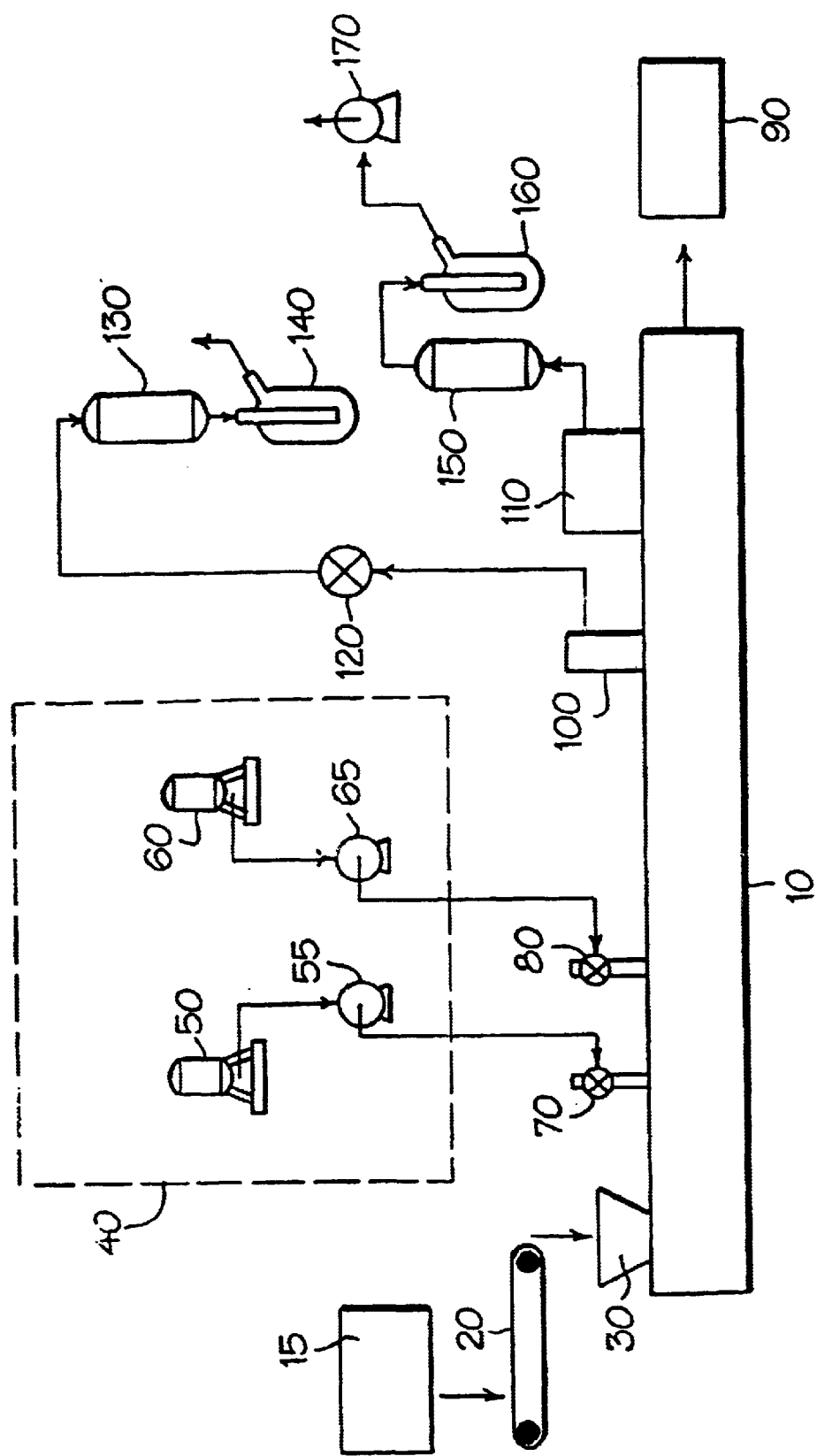

PROCESSES FOR PREPARING GRAFTED COPOLYMERS

CROSS REFERENCE TO RELATED APPLICATION

This application is a divisional of application Ser. No. 09/529,013, filed Apr. 6, 2000, now U.S. Pat. No. 6,410,652, the entire content of which is hereby incorporated by reference in this application.

BACKGROUND OF THE INVENTION

The present invention relates to processes for the preparation of graft copolymers. These processes involve the use of polar solvents in graft polymer extrusion reactions. This invention further relates to processes for preparing graft polymers useful as dispersant viscosity index improvers.

Solution grafting is a well known method for producing polymers. Typically, various reagents are introduced, either neat or as solutions in various solvents, into one or more reaction vessels containing solvent. The desired polymer product must sometimes then be separated from the reaction solvents and/or impurities by appropriate purification steps. Thus, these methods are limited by factors such as: practicality, availability and cost of solvents; practicality and economics of required purification procedures; and concerns surrounding generation and disposal of waste products associated with the processes.

Even when the reaction medium makes up part of the desired end product, solution grafting may be undesirable in terms of costs and logistics of transporting and storing the end product compared to a more concentrated polymer product. For example, some dispersant viscosity index improvers (DVII's) are made by a solution grafting process where a base oil is the solvent (See for example, U.S. Pat. No. 5,523,008). This is particularly acceptable where the DVII in base oil will ultimately comprise a lubricating oil formulation. In certain instances, however, it would be more economical and safer to transport and store a more concentrated form of the DVII for later blending with the base oil.

Current methods of producing polymer products for lubrication applications require that the reaction polymer product be further processed in order to achieve the desired physical characteristics. For example, to achieve a desired shear stability Index (SSI), a measure of potential for in-service viscosity loss, the polymer product must be subjected to homogenization (i.e mechanical shearing) in order to create a polymer product with uniform and consistent viscosity characteristics The presence of undesirable reaction by-products is responsible, in part, for the necessity of such further processing. Thus, reducing the formation of reaction side products may also reduce or eliminate the necessity for downstream homogenization in order to achieve a polymer product with the desired finished characteristics.

One such undesirable side polymerization process that may occur is coupling of the polymer starting material with itself. This chain extension process leads to larger chain polymers that ultimately affect the purity of the graft polymer product resulting from the desired polymerization reaction.

Another undesirable side polymerization process that may occur in solution grafting processes is reaction between the solvent and the monomer. For instance, in solution grafting where base oil is the solvent, this type of side polymerization process results in the production of monomer-grafted base oil polymers. These by-products may contaminate the desired graft polymer and thus may be introduced into the lubrication oil formulations with the desired graft polymer product. The presence of the monomer-grafted base oil polymers in the lubrication oil formulations detrimentally affects seal compatibility in engines utilizing such formulations.

Grafted polymers made by solution processes include those described in U.S. Pat. No. 5,523,008. U.S. Pat. No. 5,523,008 (herein incorporated by reference in its entirety) discloses novel grafted polymers comprising polyolefin backbones grafted with ethylenically unsaturated nitrogen or oxygen-containing monomers. Additionally, dispersant/viscosity index improvers ("DVII's") and lubricating oil compositions comprising the grafted polymer products are disclosed. Furthermore, methods for manufacturing such grafted polymers, DVII's and lubricating oil compositions are disclosed therein. The grafted polymers described in this patent are shown to possess desirable properties and characteristics that are advantageous for use as dispersant/viscosity index improvers and as dispersants.

Another example of grafted polymers made by solution processes include those described in U.S. Pat. No. 5,298,565. U.S. Pat. No. 5,298,565 describes graft copolymers prepared by grafting, onto a polymeric substantially saturated hydrocarbon backbone, a free-radical polymerizable vinyl nitrogen monomer. While the disclosure teaches a certain stoichiometry of starting reagents to make such graft polymers, it is unclear what actual proportion of grafted monomer is present in the polymer product. Additionally, this patent teaches preparation of the graft copolymers by a solution grafting process using aliphatic hydrocarbon-substituted aromatic solvents. The disclosure also states that these graft copolymers may be prepared in different types of reactors, including extruders and kettle-type reactors (col. 11, lines 50–52).

Extrusion reactions are an alternative to the solution grafting processes described above. U.S. Pat. No. 5,424,367 describes processes for carrying out multiple sequential chemical reactions on polymeric feedstock carried out in an extruder with multiple reaction zones. The key feature of the process is the removal of impurities from one reaction zone before a subsequent reaction occurs in a subsequent reaction zone in the extruder. In one embodiment of this process, feed of water upstream of the first reaction zone leads to less colored products. An additional embodiment described in this application is a process for the production of grafted polymers in an extruder reactor by feeding water prior to the grafting reaction zone. It is understood that the water is not incorporated into the polymer when using the procedure outlined for introduction of the water into the extruder.

Existing extrusion processes, however, still suffer from some limitations. For instance, not all types of reactants are amenable for use in existing extrusion methods because of their inability to be introduced and mixed into the reaction process such that a sufficiently uniform grafted product results.

Thus, a need still exists for improved methods of making grafted copolymer products. Ideally, such methods should be more efficient, reduce undesired by-product formation and be less costly to operate.

SUMMARY OF THE INVENTION

This invention provides a method of making a graft copolymer, comprising the steps of:

(a) providing (i) an ethylene/propylene (EP) copolymer or other graftable polymer, (ii) an ethylenically unsaturated sulfur-, nitrogen- and/or oxygen-containing monomer, and (iii) an amount of an initiator sufficient to graft said monomer and EP copolymer or other graftable polymer;

(b) introducing said EP copolymer or other graftable polymer into a melt-blending apparatus, preferably an extruder;

(c) introducing said monomer into the melt-blending apparatus, preferably the extruder;

(d) introducing said initiator into the melt-blending apparatus, preferably the extruder; wherein at least one of the above-identified reactants in (a) is introduced into the melt-blending apparatus in the presence of at least either a polar or a non-polar solvent; and (e) reacting said EP copolymer or other graftable polymer, monomer and initiator by operating the melt-blending apparatus, preferably the extruder, thereby forming the graft copolymer.

This method can be used for producing a graft polymer containing at least 8 moles of N-vinylimidazole (VIMA) per mole of EP copolymer backbone. The graft polymer can alternatively be defined as containing more than about 0.7% by weight of VIMA grafts on EP copolymer backbone. The polyolefin has a weight average molecular weight of from about 20,000 to about 500,000 and a polydispersity of less than about 10. This method has several advantages over existing methods of making such graft polymers. The extrusion process with reactant introduction in a solvent allows for greater reaction efficiency in utilization of raw materials. The extrusion process dispenses with the necessity for high solvent volumes as compared to solution grafting processes. This results in lower reaction costs associated with the reduced requirements for solvent, not having to remove the solvent from the graft polymer product and savings associated with ease of transport of the more concentrated form of grafted polymer product that results from these processes.

The extrusion processes of this invention, which do not utilize the solvent volumes typically used in solution grafting, minimize or eliminate production of undesirable solvent grafted by-products. These by-products are produced by the side reaction of reactants with the solvent during the grafting reaction process.

The use of polar solvents in these processes provides improved mixing of the reactants, which aids in the suppression of undesirable side polymerization reactions, and thus improved reaction efficiency. They also participate to some degree in control of reaction exotherms through their volatility, i.e., some of the heat generated in the reaction is dissipated by "flashing" of the solvent from liquid to a gas that is vented away. These processes also allow for grafting with reactive chemical intermediates that heretofore could not be utilized in an extruder.

This invention can also minimize undesired side reactions by utilizing saturated polymer starting materials, such as ethylenelpropylene (EP) copolymer. Such saturated polymers have a reduced propensity to undergo coupling side polymerization reactions as compared to polymers possessing sites of unsaturation.

The methods of this invention may be utilized to produce specifically tailored grafted polymer products that meet desired physical and chemical characteristics for a particular application (i.e., dispersant, viscosity index improver) while avoiding the necessity for the post-reaction processing (i.e., mechanical shearing) sometimes necessary in other methods of producing polymer products.

Another aspect of this invention is the production of a dispersant-viscosity index improver (DVII) by the aforementioned method. The graft copolymers produced by this method can have ADT dispersancy values of from about 2 to about 4, preferably from about 4 to about 8, more preferably from about 8 to about 16, and most preferably from about 16 to about 32 or higher.

In an alternate embodiment, this invention relates to a method for making a lubricating oil comprising: (a) providing (i) a lubricating base oil, and (ii) a dispersant viscosity index improver made by the method described above; and (b) mixing the dispersant viscosity index improver in the base oil.

In another alternate embodiment, this invention provides graft polymer products produced by the aforementioned methods. These graft polymer products differ from graft polymer products made from conventional methods in that they contain reduced levels of solvent, have greater seal compatibility, yet retain high ADT dispersancy values.

BRIEF DESCRIPTION OF THE DRAWING

The FIGURE is a schematic view of the extruder and related equipment utilized in the methods of this invention.

DETAILED DESCRIPTION OF THE INVENTION

This invention is a method of making a graft copolymer, comprising the steps of:

(a) providing (i) an ethylene/propylene (EP) copolymer or other graftable polymer, (ii) an ethylenically unsaturated sulfur-, nitrogen- and/or oxygen-containing monomer, and (iii) an amount of an initiator sufficient to graft said monomer and EP copolymer or other graftable polymer such as EPDMs (ethylene/propylene/diene monomers);

(b) introducing said EP copolymer or other graftable polymer into a melt-blending apparatus, preferably an extruder;

(c) introducing said monomer into the melt-blending apparatus, preferably the extruder;

(d) introducing said initiator into the melt-blending apparatus, preferably the extruder; wherein at least one of the above-identified reactants in (a) is introduced in the presence of at least either a polar or a non-polar solvent; and (e) reacting said EP copolymer or other graftable polymer, monomer and initiator by operating the melt-blending apparatus, preferably the extruder, thereby forming the graft copolymer.

In one preferred embodiment of the invention, at least two of the reactants in (a) are introduced into the melt-blending apparatus, preferably the extruder, in the presence of at least either a polar solvent or a non-polar solvent.

In a second preferred embodiment of the invention, all of the reactants in (a) are introduced into the melt-blending apparatus, preferably the extruder, in the presence of at least either a polar solvent or a non-polar solvent.

In a third preferred embodiment of the invention, the monomer is introduced into the extruder in the presence of a polar solvent and the initiator is introduced into the melt-blending apparatus, preferably the extruder, in the presence of a non-polar solvent.

In a further embodiment of the invention, all of the reactants in (a) are introduced into the melt-blending apparatus, preferably the extruder, at the same time.

In a further embodiment of the invention, the monomer is introduced into the melt-blending apparatus, preferably the extruder, in the presence of a polar solvent.

The polar solvent is preferably selected from: water, alcohols, esters, aldehydes and ketones. The polar solvent is preferably water.

The non-polar solvent is preferably selected from: hydrocarbons such as hexane, decane and hexadecane; kerosenes; poly alpha-olefins such as 4cSt, 6cSt and 8cSt poly alpha-olefins; solvent refined basestocks; hydrocracked basestocks; and hydroisomerized basestocks.

In another embodiment, the method further comprises (after step (e)) the additional step of: (f granulating the resulting extruded copolymer.

The graft copolymer produced in the method of the present invention may be formed into pellets, crumbs or bales, or made into a solution.

Reaction Materials

The following are examples of graftable polymers, graftable monomers, initiators, solvents, and optional inhibitors contemplated for use in the methods of this invention. The term "mixture" refers to combinations of agents, including, for example, solutions, dispersions, emulsions, slurries, and the like.

Polymers

Saturated polymers are specifically contemplated for use in the methods described above. The graftable polymers in the methods described above comprise a polymer of ethylene, propylene, or isoprene or copolymers thereof, such as ethylene/propylene (EP). Partially unsaturated copolymers are also contemplated. Crystalline and amorphous forms of the aforementioned polymers and copolymers are also contemplated for use in the methods of this invention High Mooney amorphous polymers, exemplified by Enichem CO-051, are also envisioned as polymers suitable for this invention. The use of a blend of graftable polymers is also contemplated.

The polymers contemplated for use in this invention include the following:
- olefin polymers such as various forms of polyethylene, ethylene, propylene, isoprene, ethylene-propylene copolymers (EP), and the like;
- polymers from dienes including: styrene butadiene rubber, polyisoprene, ethylene-propylene diene terpolymers (EPDM), and the like; and
- vinyl and vinylidene polymers including: acrylic polymers such as polymethylmethacrylate, polystyrene and its family of copolymers such as butadiene-styrene, and the like.

Additionally, the polymers contemplated for use herein include those suggested in U.S. Pat. No. 5,523,008, col. 4, I. 28 to col. 5, I. 2. A wide variety of polymers having pendant unsaturation are also contemplated for use herein as a backbone for grafting. Several examples of polymers contemplated for use herein include the polymers suggested by U.S. Pat. No. 4,092,255, col. 1, II. 29–32: polyisobutene, polyalkylstyrenes, partially hydrogenated polyolefins of butadiene and styrene, amorphous polyolefins of ethylene and propylene, and isoprene copolymers.

The polymers contemplated herein may have weight average molecular weights of from about 20,000 to about 500,000 and polydispersities from about 1 to about 15.

Specific materials which are contemplated for use herein include: Mitsui XLL-10, XLM-12, XLH-15 and XLH-17 amorphous ethylene/propylene rubbers sold by Mitsui Petrochemical Industries, Ltd., Tokyo, Japan; VISTALON ethylene/propylene polyolefins, sold by Exxon Chemical Americas, Houston, Tex.; Shell Vis polymers, such as, SV-250 hydrogenated isoprene copolymer, SV-200 and SV-300 styrene/isoprene polymers, and. SV-40 and SV-50 styenelbutadiene polymers sold by Shell Chemical Co., Houston, Tex.; Dutral CO and Dutral CT amorphous ethylene/propylene elastomers, such as, CO-034 and CO-043, Buna EPM copolymers sold by Bayer Corporation , Akron, Ohio; and Lubrizol-7441 and -7340 polymers sold by Lubrizol Corporation, -Wickliffe, Ohio; combinations of the above materials; and other, similar materials.

Graftable Monomers

Broadly, any of the graftable monomers previously used to graft polyolefins are also contemplated for use herein. For example, the monomers recited in U.S. Pat. No. 4,146,489, col. 4, II. 2 through 41; U.S. Pat. No. 4,092,255, from col. 2, I. 45, to col. 3, I. 47; U.S. Pat. No 4,810,754, from col. 3, I. 24, to col. 4, I. 4, and U.S. Pat. No. 4,460,788 from col. 1, II. 49–60 are hereby incorporated herein by reference.

Specific graftable monomers contemplated for use herein include the following:
  N-vinylimidazole;
  1-vinyl-2-pyrrolidinone;
  C-vinylimidazole;
  N-allylimidazole;
  1-vinylpyrrolidinone;
  2-vinylpyridine;
  4-vinylpyridine;
  N-methyl-N-vinylacetamide;
  diallyl formamide;
  N-methyl-N-allyl formamide;
  N-ethyl-N-allyl formamide;
  N-cyclohexyl-N-allyl formamide;
  4-methyl-5-vinyl thiazole;
  N-allyl diisooctyl phenothiazine;
  2-methyl-1-vinylimidazole;
  3-methyl-1-vinylpyrazole
  N-vinylpurine
  N-vinylpiperazines
  N-vinylsuccinimide
  vinylpiperidines
  vinylmorpholines
  maleic anhydride
  maleic acid
  acrylic acid
  aminopropylimidazole
as well as combinations of those materials or other, similar materials. More broadly, any sulfur-, oxygen- and/or nitrogen-containing ethylenically unsaturated, aliphatic or aromatic monomers having from 2 to about 50 carbon atoms, as well as combinations of such monomers, are contemplated for use as graftable monomers herein.

In the processes of this invention, the monomer can be added as a mixture with a polar solvent. The monomer is preferably added as a mixture with the solvent comprising from about 5% to about 95% (w/w), preferably from about 10% to about 90% (w/w), more preferably from about 20% to about 85% (w/w), even more preferably from about 30% to about 75% (w/w), even more preferably from about 40% to about 65% (w/w), and most preferably from about 45% to about 60% (w/w), monomer in solvent. Specifically contemplated is the addition of the monomer as a solution comprising water. Although solutions are described herein, this invention also contemplates additions as dispersions or emulsions where appropriate, in which case what has been referred to as a solvent may be considered a diluent.

Initiators

Broadly, any free-radical initiator capable of operating under the conditions of the present reaction is contemplated for use herein. The initiator can be a peroxy initiator, an azo initiator, or combination thereof. These include, for example, alkyl and dialkyl peroxides, aryl and diaryl peroxides diacyl peroxides, ketone peroxides, peroxydicarbonates, peroxyesters, peroxyketals, hydroperoxides and azo initiators. Representative initiators are disclosed in U.S. Pat. No. 4,146,489, col. 4, II. 45–53, which is incorporated herein by reference. Specific initiators contemplated herein include for example:

- di-t-butyl peroxide,
- dicumyl peroxide;
- t-butyl-cumyl peroxide;
- t-butyl perbenzoate;
- t-amyl perbenzoate;
- t-butyl peroxyacetate;
- t-butyl peroxybenzoate;
- benzoyl peroxide;
- di-t-butyl peroxy phthalate
- 2,5,-dimethyl-2,5,-di(t-butyl peroxy)hexane;
- 2,5,-dimethyl-2,5,-di(t-butyl peroxy)hexyne;

and combinations thereof; azo initiators, for example:

- butanenitrile,2-methyl,2,23-azobis;
- propanenitrile,2-methyl,2,23-azobis;
- 2,23-azobis(2,4-dimethylpentane nitrile);
- 1,13-azobis(cyclohexanecarbonitrile);
- azoisobutyronitrile (AIBN);

and combinations thereof; hydroperoxide initiators, for example:

- hydrogen peroxide;
- 2,5-dihydroperoxy-2,5-dimethyl hexane (Luperox®, Elf Atochem, Philadelphia, Pa.);
- cumene hydroperoxide;
- t-butylhydroperoxide;
- t-amylhydroperoxide;

and combinations thereof; and other similar materials. Any of the above classes of initiators or specifically listed initiators may be used in combination to provide optimal radical initiation throughout the entire reaction process. Depending on the physical and chemical properties of each individual initiator, the initiator may be available in pure form or as a compositional blend. These compositional blends may include water, organics (i.e., alkyl, aryl, phenyl, hydrocarbons), alcohols, stabilizers, preservatives or other additives known in commercial compositional blends or in the peroxide art. These formulations may be used in the processes of this invention as commercially supplied (i.e., admixed with solvent for injection into the extruder) or may be subjected to known additional preparation or purification steps prior to use in the processes of this invention.

Each such initiator commonly has an appropriate minimum reaction initiation temperature, above which it will readily initiate a reaction and below which the reaction will proceed more slowly or not at all. Consequently, the minimum reaction temperature is commonly dictated by the selected initiator.

In the processes of this invention, the initiator may be added as a solution in a hydrocarbon solvent or a polar solvent (or diluent). Naphtha is a specifically contemplated hydrocarbon solvent. Water is a specifically contemplated polar solvent. The initiator is added as a mixture with the solvent comprising from about 5% to about 95% (w/w), preferably from about 10% to about 90% (w/w), more preferably from about 15% to about 85% (w/w), even more preferably from about 20% to about 80% (w/w), even more preferably from about 25% to about 75% (w/w), even more preferably from about 30% to about 65% (w/w), and most preferably from about 35% to about 55% (w/w), of initiator in solvent. Although solutions are described herein, this invention also contemplates additions as dispersions or emulsions where appropriate.

Solvents

Both polar and non-polar solvents impart particular advantages in the extrusion methods of this invention. Such solvents may allow for more uniform mixing of reagents, may aid in the mediation of the reaction temperature and their use may provide safety advantages including reduced waste generation and reduced waste remediation costs. These solvents facilitate addition of one or more reagents during the process of making grafted polymers, and may, where appropriate, also be used in these methods for purposes other than introduction of reactants (e.g., for reaction temperature modulation, reaction mixture uniformity, reaction mixture handling or processing, and the like).

Solvents in the methods of this invention are those solvents capable of forming a mixture (i.e., solution, dispersion, emulsion, slurry, etc.) with a reagent used in the methods of this invention. Examples of polar solvents include: water, dimethyl sulfoxide (DMSO), alcohols, aldehydes, ketones (e.g. acetone), esters, nitrites, sulfoxides or combinations thereof. Water is particularly advantageous as a polar solvent for introduction of the monomer, particularly vinyl imidazole, in the extrusion methods described above. Water can also be added as a solvent for the introduction of water-soluble hydroperoxide initiators. Moreover, the higher safety profile of water relative to other solvents improves the overall safety of the polymer production method and further reduces handling and waste removal/disposal costs associated with operation of the extrusion process.

Other solvents useful in the processes of this invention include volatile solvents which are readily removed or stripped from the grafted polyolefin during reaction or after the reaction is complete. These solvents are typically useful for addition of one or more reagents during the extrusion process. Any solvent may be used which can disperse or dissolve one or more of the remaining components of the reaction mixture and which will not participate appreciably in the reaction or cause side reactions to a material degree. Several examples of solvents of this type include straight chain or branched aliphatic or alicyclic hydrocarbons, such as n-pentane, n-heptane, i-heptane, n-octane, i-octane, nonane, decane, cyclohexane, tetrahydronaphthalene, decahydronaphthalene (sold, for example, under the trademark DECALIN by E.I. Du Pont de Nemours & Co., Wilmington, Del.). Other solvents contemplated include ethers, kerosenes, poly alpha-olefins such as 4cSt, 6cSt and 8cS poly alpha-olefins; solvent refined basestocks; hydrocracked basestocks; and hydroisomerized basestocks. Mixtures of the above are also contemplated as solvents for use herein. Nonreactive halogenated aromatic hydrocarbons such as chlorobenzene, dichlorobenzene, dichlorotoluene and others are also useful as solvents.

The solvents useful here also include base oil which will be suitable for incorporation into a final lubricating oil product. Examples of suitable solvents of this type are disclosed in U.S. Pat. No. 5,523,008.

Mixtures of both polar and non-polar solvents are also contemplated for use in the present invention.

Inhibitors

Inhibitors may optionally be used in the present grafting reaction, where appropriate, to limit the degree of crosslinking of the polymer. The inventors contemplate that limiting the amount of crosslinking will reduce the viscosity increase resulting from the grafting reaction and provide a final grafted polyolefin which has improved shear stability. Inhibitors may also be used to moderate or control monomer consumption in the grafting process via coupling reactions or to facilitate efficient mixing and distribution of the monomer in the reaction mixture.

One category of inhibitors contemplated herein is that of hindered phenols, which are commonly used as antioxidants or free radical inhibitors. One representative hindered phenol for this purpose is octadecyl 3,5-di-tert-butyl-4-hydroxyhydrocinnamate, which is sold as Irganox 1076 by Ciba-Geigy Corp. Another representative inhibitor is hydroquinone.

Extrusion Reaction Conditions

The present invention can be carried out by providing a melted reactant composition in an extruder. The preferred vessel in the aforementioned methods is an extruder, preferably, a twin screw extruder. Both intermeshing and non-intermeshing extruder mechanisms are contemplated in this invention. Non-intermeshing mechanisms provide for less mechanical shearing in the process and operate at lower reaction temperatures.

The contemplated proportions of the graftable monomer to the graftable polymer and reaction conditions are selected so that at least an effective percentage, ideally most or all of the molecules of the graftable monomer, will graft directly onto the graftable polymer, rather than forming dimeric, oligomeric, or homopolymeric graft moieties or entirely independent homopolymers. At the same time, a high loading of the graftable monomer onto the polymeric backbone is contemplated. The inventors contemplate that at least about 5 moles, preferably at least about 6 moles, more preferably at least about 7 moles, and most preferably at least about 8 moles of the graftable monomer are grafted per mole of the starting polymer.

The reaction mixture is placed in a suitable polymer extruder or other mixer for melt-blending high-viscosity compositions. (Where an extruder is referred to in this disclosure, it should be understood that this is exemplary of the broader class of mixers which may be used for melt-blending according to the present invention.)

A schematic of the process is illustrated in the FIGURE. This schematic merely exemplifies the overall process of this invention and is not to be construed as a limitation of any kind on the extruder used in this invention or on the process itself. The reactants are introduced into and react in the twin screw extruder 10 to form the graft polymer product. The starting polymer (i.e., EP rubber pieces 15) is fed by a conveyer belt 20 into a feed hopper 30 through which the polymer is introduced into the extruder 10. The monomer and initiator are supplied by x feed system 40. The feed system 40 comprises a monomer supply 50 connected to a pump 55 and an initiator supply 60 connected to a pump 65. Multiple peroxide supplies and pumps such as 60 and 65 may be utilized. The pumps, 55 and 65 are independently connected to injection ports, 70 and 80, respectively, to allow introduction of the monomer and initiator into the extruder 10. If multiple supplies and pumps are utilized, multiple injection ports, such as those exemplified by ports 70 and 80, are contemplated on the extruder 10. It is also contemplated that the order and position of the injection ports may be varied from that illustrated depending on the specific extrusion reaction.

When the extruder 10 is operating, the reaction mixture is moved continuously through the extruder in the direction of the sample collector 90, and each reactant is introduced into the extruder 10 at the appropriate time. The graft polymer product is collected at a sample collector 90. The extruder 10 is typically fit with at least one pressure vent 100 and at least one vacuum vent 110. These vents allow removal of volatiles such as solvents or reaction by-products in order to stabilize pressure. The pressure vent 100 is connected via a pinch valve 120 to a condenser 130 and a solvent trap 140 to collect the volatiles. The vacuum vent 110 is also connected to a condenser 150 and a solvent trap 160 to collect the volatiles. The solvent trap 160 is connected to a vacuum pump 170 that provides the vacuum in the extruder system.

The extruder can be maintained under essentially aerobic conditions, or can be maintained under anaerobic conditions by purging or blanketing with an inert gas (which may be, for example, nitrogen, carbon dioxide, helium, or argon). The extruder is operated with a screw design and size, barrel diameter and length, die configuration and open cross-section, barrel temperature, die temperature, screw speed, pre-extrusion and post-extrusion conditions, and reactant addition ports designed to provide the appropriate residence times and reaction temperatures for the particular initiator, graftable monomer, graftable polymer, and inhibitor (if any) selected for use in the extrusion reaction.

The reaction temperature in the extruder is influenced by a number of factors, including friction resulting from mastication and flow of the polymer composition in the extruder, the exothermic character of the grafting reaction, external heating or cooling of the extruder barrel, or any combination of these expedients. At a minimum, the reaction temperature should be sufficient to consume essentially all of the selected initiator during the time allotted for the reaction. However, the temperature must be maintained to avoid undue homopolymerization of a reagent and to avoid undue production of other undesirable by-products. A more uniform grafted polymer product is produced in these methods when the reaction temperature is maintained as consistently as possible throughout the extruder barrel, particularly at the seals between process zones along the barrel. The reaction temperatures, however, may vary along the barrel of the extruder, depending on the reaction dynamics of the individual process, and still yield acceptable results. The processing conditions are, in general, chosen to optimize product yields in terms of product quality and performance.

The extruder may be operated continuously. The reactants are ideally introduced into the extruder at a steady rate over an extended period. The initiator can be added upstream of, with, or downstream of the graftable monomer. There is also flexibility in terms of introduction of the monomer. Representative solvents include those described elsewhere in this specification, including mineral oil, polar solvents as defined elsewhere in this specification, and other non-polar solvents known to those skilled in the art, depending on the choice of reagents and other factors. The solvents may be used to cut back the initiator at a relatively low level of addition, as a proportion of the overall reaction composition. The solvents may similarly be used to cut back the initiator. Delays can operationally be provided between the introductions of different ingredients by injecting the ingredients into different ports, or by using more than one port along the length of the extruder barrel.

The reaction residence time and temperature, during and after addition of each ingredient, can be controlled to provide a final product having the desired ADT or other properties.

The efficiency of the extrusion process is dependent upon a variety of factors including: reagents employed, reagent stoichiometry, reagent feed rate, screw speed, screw design, and barrel specifications (such as diameter, length, pressure and temperature). The variance of one factor may require adjustment of one or more of the other factors. These factors, however, are readily optimized by one of ordinary skill in the art without undue experimentation.

The contemplated proportions of the graftable monomer to the polyolefin and reaction conditions are selected so that an effective percentage (ideally, most or all of the molecules) of the graftable monomer will graft directly onto the polyolefin, rather than forming dimeric, oligomeric, or homopolymeric graft moieties or entirely independent homopolymers. At the same time, a high loading of the graftable monomer onto the polymeric backbone is contemplated. The graftable monomer is preferably present from 5–90 moles, more preferably from 5–65 moles, even more preferably from 5–30 moles, even more preferably from 5–20 moles, and most preferably from 5–15 moles, per mole of the starting polymer. Alternatively, the graftable monomer is preferably present from 8–90 moles, more preferably from 8–65 moles, more preferably from 8–95 moles, even more preferably from 8–30 moles, even more preferably from 8–20 moles, and most preferably from 8–15 moles, per mole of starting polymer. Alternatively, the graftable monomer is preferably present from 10–90 moles, more preferably from 10–65 moles, more preferably from 1045 moles, even more preferably from 10–30 moles, even more preferably from 10–20 moles, and most preferably from 10–15 moles, per mole of starting polymer. Alternatively, the graftable monomer is preferably present from 13–90 moles, more preferably from 13–65 moles, more preferably from 13–45 moles, even more preferably from 13–30 moles, most preferably from 13–20 moles, per mole of starting polymer.

The monomer and initiator are fed slowly at a continuous and constant ratio to the polymer.

The monomer may be introduced at a feed rate in which the range of monomer to 100 parts of polymer is: 0.005–10 to 100 parts of polymer, preferably from 0.01–10 to 100 parts polymer, preferably from 0.03–10 to 100 parts polymer, preferably from 0.05–10 to 100 parts polymer, preferably from 0.07–10 to 100 parts polymer, preferably from 0.09–10 to 100 parts polymer, preferably from 0.1–10 to 100 parts polymer, preferably from 0.3–10 to 100 parts polymer, preferably from 0.4–10 to 100 parts polymer, and most preferably from 0.4–6 to 100 parts polymer.

The initiator may be introduced at a feed rate in which the range of initiator per 100 parts of polymer is: 0.0008–10 to 100 parts of polymer, preferably from 0.001–10 to 100 parts polymer, preferably from 0.003–10 to 100 parts polymer, preferably from 0.005–10 to 100 parts polymer, preferably from 0.008–10 to 100 parts polymer, preferably from 0.01–10 to 100 parts polymer, preferably from 0.02–10 to 100 parts polymer, preferably from 0.04–10 to 100 parts polymer, and most preferably from 0.07–4 to 100 parts polymer.

The graftable monomer may be introduced into the reactor all at once, in several discrete charges, or at a steady rate over an extended period. The graftable monomer may be added neat, in solid or molten form, or cut back with a solvent.

The contemplated proportions of the initiator to the graftable monomer and the reaction conditions are selected so that at least many and ideally all of the molecules of the monomer will graft directly onto the polyolefin, rather than forming dimeric, oligomeric, or homopolymeric graft moieties or entirely independent homopolymers. The contemplated minimum molar proportions of the initiator to the graftable monomer are from about 0.02:1 to about 1:1. No specific maximum proportion of the initiator is contemplated, though too much of the initiator may degrade the polyolefin or cause other problems in the finished formulation, would be uneconomical, and should be avoided for these reasons.

The initiator can be added before, with or after the graftable monomer, so the amount of unreacted initiator which is present at any given time is much less than the entire charge, and preferably a small fraction of the entire charge. In one embodiment, the initiator may be added after all the graftable monomer has been added, so there is a large excess of both the graftable monomer and the polyolefin present during essentially the entire reaction. In another embodiment, the initiator may be added along with the graftable monomer, either at the same rate (measured as a percentage of the entire charge added per minute) or at a somewhat faster or slower rate, so there is a large excess of the polyolefin to unreacted initiator, but so the amount of the unreacted graftable monomer is comparable to the amount of unreacted initiator at any given time during the addition.

Although the present invention is exemplified in the examples by processes in an extruder, the reaction may alternatively be run in an alternate reaction apparatus with sufficient mixing for a melt-blend process. Suitable conditions for reaction in an alternate reaction apparatus are exemplified by those disclosed in U.S. Pat. No. 5,663,126 (herein incorporated by reference in its entirety).

In an alternate embodiment, this invention relates to a method for making a lubricating oil comprising: (a) providing (i) a lubricating base oil, and (ii) a dispersant viscosity index improver made by the methods of this invention described above; and (b) mixing the dispersant viscosity index improver into the base oil. The DVII made by the method described above, desirably has the property of raising the viscosity index of the lubricating oil blend by at least about 20 points when used as a 1% by weight solids concentration in the blend. (The dispersant viscosity index improver, however, may be used in an amount which is more or less than 1% by weight solids of a lubricating oil composition.) Such a lubricating oil employs both the dispersancy and the viscosity improving properties of the grafted polymer product, so less of the oil composition than before is occupied by dispersants and viscosity improving ingredients. For example, a 10W-30 lubricating oil can be formulated which employs more of a low-volatility conventional base stock (which has a higher viscosity) than previous formulations. This allows the formulator greater latitude to formulate a multi-viscosity lubricant composition which will stay within the viscosity specifications of the grade, provide equal or superior performance, and yet contain less volatiles from the base stock.

In an another alternate embodiment, this invention provides polymer products produced by the aforementioned methods of this invention.

The graft polymer produced by the aforementioned methods is preferably a dispersant viscosity index improver, preferably a DVII with an ADT rating of at least about 2, preferably a DVII with an ADT rating of at least about 4, preferably a DVII with an ADT rating of at least about 8, preferably a DVII with an ADT rating of at least about 16 and preferably a DVII with an ADT rating of at least about 32 or higher.

One measure of the suitability of a grafted polymer for use in engine lubrication formulations is seal compatibility, that is, the effect the grafted polymer has upon contact with the various elastomeric (rubber) seals of an engine under conditions (e.g., temperature, pressure, physical contact time) of use. Ideally, a superior grafted polymer will have little or no effect on the seal such that degradation of the seal and its inherent physical characteristics is minimal. The degradation may be measured in terms of the hardness, brittleness, change in tensile strength or change in elongation of the seal before and after exposure to the test formulation.

Grafted Polyolefin Test Methods
Percent Grafted Nitrogen

This test can be used to determine the proportions of nitrogen on the grafted polymer product and on any process fluids (assuming the reaction is carried out in the presence of solvent and that solvent is not "flashed" or physically removed in some manner during the process). The results of this test can be used to determine the degree of grafting. This may be accomplished, for example, in the manner described in U.S. Pat. No. 5,523,008. If the grafted polymer products of the processes of this invention contain any residual solvent, the solvent can be separated from the desired product by the methods described in U.S. Pat. No. 5,523,008.

Determination of Level of Grafted Monomer Via Infra Red Spectroscopy

The level of grafted monomer can be determined using Infrared spectroscopy; a typical unit being the Model 1720 Perkin-Elmer Infrared Fourier Transform Spectrometer. A suitable method is as follows: The polymer is dissolved in base oil, such as PetroCanada HT160 (P160 N), and is then precipitated from the homogeneous solution using heptane followed by acetone. A thin film is then prepared by placing the precipitate in a Carver Model C hydraulic press operated at 8000 psi for 15 seconds at 150° C. The film is then mounted in the IR beam and the spectrum generated over the range of frequencies from 600 $cm^{-1}$ to 4000 $cm^{-1}$. The spectral regions of interest are those due to the vinylimidizole ring which ranges from about 650 $cm^{-1}$ to about 680 $cm^{-1}$ (defined as Region 1) and those due to the polymer methylene group which ranges from about 685 $cm^{-1}$ to about 790 $cm^{-1}$ (defined as Region 2). The areas under these spectral regions, 1 and 2, are then determined by integration and the relative area of the product and is compared to that of a grafted polymer sample of a known VIMA concentration. Based upon the relative responses of "known" sample to "unknown" sample, the concentration of VIMA may be established.

ADT Procedure

The ADT (asphaltene dispersancy test) value of a dispersant is a measure of its efficacy for dispersing typical contaminants, such as crankcase sludge, in a lubricant formulation. A high ADT is favorable, as it indicates that only a small quantity of the dispersant is necessary to disperse a standard quantity of sludge. The ADT test is based on a test method developed by The Rohm & Haas Co., Philadelphia, Pa., and described in U.S. Pat. No. 4,146,489.

In summary, the ADT test is carried out as follows: A sample of the grafted polyolefin is dissolved in Exxon 130N base oil to give a solution containing 0.25% weight of polyolefin solids. Separately, 10 ml of Exxon 130N base oil is put into each of a series of six test tubes in a test tube rack 10 ml of the grafted dispersant polyolefin solution is then added to the base oil in the first test tube in the series. The base oil and grafted dispersant polyolefin solution in the first test tube are mixed until homogeneous, giving a solution which contains one half of the concentration of grafted dispersant polyolefin contained in the original solution. From this first tube, 10 ml are decanted and poured into the second tube. The contents of the second tube are further diluted by a factor of 2. This process of sequential dilution is continued through the series of tubes, successively producing solutions with ¼, ⅛, ¹⁄₁₆, and ¹⁄₃₂ of the concentration of grafted dispersant polyolefin contained in the first tube.

A standardized quantity of sludge solution (as described in U.S. Pat. No. 4,146,489), simulating the sludge in the crankcase of an internal combustion engine, is introduced and mixed well in each of the above prepared solutions. The tubes are allowed to stand at room temperature for 24 hours (or, in some cases, for a shorter or longer period, as indicated in the test results). The tubes of each set are examined in front of a light source to determine which tube is the first in the series to exhibit sediment (fallout), this being associated with sludge which is not successfully dispersed. The ADT result is graded as follows:

| # OF TUBES WITH NO SEDIMENT | FIRST FALLOUT PRESENT IN TUBE # | REPORTED ADT RESULT |
| --- | --- | --- |
| 0 | 1 | FAIL |
| 1 | 2 | 1 |
| 2 | 3 | 2 |
| 3 | 4 | 4 |
| 4 | 5 | 8 |
| 5 | 6 | 16 |
| 6 | — | 32 |

The ADT result is reported to the nearest power of two because the concentration of the grafted dispersant polyolefin solution is halved in each successive tube.

More tubes can be added to the test to test for higher ADT values, if desired.

Rapid ADT Procedure

The rapid ADT test is an accelerated version of the ADT test method described above. The test is carried out as described for the 24-hour test, except that the test tubes are initially kept in an oven for 90 minutes at 60° C. The tubes are graded in the same manner as before to determine the rapid ADT value of the grafted dispersant polyolefin solution. After this accelerated test, the tubes can be maintained for an additional 24 and 48 hours at room temperature to record longer-term results.

Seal Compatibility Procedure

Seal compatibility is tested by incorporating the test grafted polymer in a lubrication formulation (comprising base oil and necessary additives) and exposing the seal to the formulation under conditions similar to actual use conditions. The hardness of the seal, the change in tensile strength, the change in elongation of rupture, and observations of cracks in the seal are compared before and after exposure to the lubrication formulation to assess seal compatibility.

Determination of Level of Unreacted Monomer Via Gas Chromatography

The concentration of unreacted monomer may be determined using Gas Chromatography (GC); a typical instrument being the Perkin-Elmer 8500. The GC uses a 30m megabore column having a 0.53 mm ID with DB1 as the stationary phase. A suitable method is as follows: The injector and detector temperatures are set at 210° C. and 230° C. respectively. The temperature of the oven is raised in three stages. The oven temperature is set to 70° C. and is kept at 70° C. for 5 mins. It is then raised at a rate of 10° C. per min. to 85° C. The oven temperature is kept at 85° C. for 1.5 mins. and is then raised at a rate of 15° C. per min. to 130° C., at which time the analysis is considered complete. A THF solution containing about 3% solids polymer is prepared. About 0.5 microliters of this solution is injected onto the GC column. The response from the sample is compared with a standard sample of VIMA.

Lubricating Oil Compositions

The lubricating oil compositions of the present invention preferably comprise the following ingredients in the stated proportions:

A. from about 70% to about 96% by weight, preferably from about 80% to about 95% by weight, preferably from about 88% to about 93% by weight, of one or more base oils (including any process fluid carried over from the process for making the grafted polyolefins);
B. from about 0.25% solids to about 2% solids by weight, preferably from about 0.5% solids to about 1.5% solids by weight, preferably from about 0.8% solids to about 1.2% solids by weight, preferably from 0.25% solids by weight to 1.2% solids by weight, preferably from 0.8% solids by weight to 1.5% solids by weight, of one or more of the grafted polyolefins made according to the processes of this invention;
C. from about 0.05% solids to 1.0% solids by weight, preferably from about 0.05% solids to about 0.7% solids by weight, preferably from about 0. 1% solids to about 0.7% solids by weight, of one or more polyolefins other than the grafted polyolefins according to the present invention;
D. from 0 to about 15% by weight, preferably from about 0.5% to about 10% by weight, preferably from about 0.5% to about 6% by weight, or preferably from about 0.7% to about 6%, of one or more dispersants which are not grafted polyolefins according to the present invention;
E. from about 0.3% to 4% by weight, preferably from about 0.5% to about 3% by weight, preferably from about 0.5 to about 2% by weight, of one or more detergents;
F. from about 0.01% to 3% by weight, preferably from about 0.04% to about 2.5% by weight, preferably from about 0.06% to about 2% by weight, of one or more anti-wear agents;
G. from about 0.01% to 2% by weight, preferably from about 0.05% to about 1.5% by weight, preferably from about 0.1% to about 1% by weight, of one or more anti-oxidants; and
H. from about 0.0% to 1% by weight, preferably from about 0.005% to about 0.8% by weight, preferably from about 0.005% to about 0.5% by weight, of minor ingredients.

The function and properties of each ingredient identified above and several examples of ingredients are specified in the following sections of this specification. Alternatively, chemical functional groups that provide the functions and properties of each ingredient listed above may also be incorporated in the monomer in the methods of this invention resulting in graft polymers that internally incorporate the functions and properties of the desired additive ingredient, thus eliminating the need for addition of that additive to the lubricating oil composition.

In addition to the grafted polymer products made by the processes of this invention, the lubricating oil compositions may also comprise additional agents including, for example, base oils (petroleum based or synthetic), non-grafted polyolefins, dispersants, detergents, anti-wear agents, antioxidants, pour point depressants and other minor ingredients, all described in U.S. Pat. No. 5,523,008, as well as the grafted polymer products disclosed in U.S. Pat. No. 5,523,008.

In order that this invention be more fully understood, the following examples are set forth. These examples are for the purpose of illustration only and are not to be construed as limiting the scope of the invention in any way.

EXAMPLES

Equipment and Materials

A schematic view of the overall process is shown in the FIGURE.

A. Reactor Extruder

A Welding Engineers' model HT-2000-F11-M-21-523-E 2" twin screw extruder was used. This extruder used up to four liquid additive injection ports along the axial direction. Instrumented spacer plates 1.5 inch (3.8 cm) thick were available for two injection ports, while five injection ports were available in barrel 3, and four more injection ports were available in barrel 4. The ratio of total extruder length to its diameter ("L/D") for the twin screw section was 57:1. The extruder also had a 3:1 L/D single screw discharge.

B. Extruder Heating

The extruder was initially heated by two zones of hot oil. The first zone included the second through fifth barrels, and the second zone was used to heat barrels six through nine. Plant water was used to cool the feed barrel, and the die was electrically heated. p C. Feed Equipment The feed system for pelletized rubbers consisted of a K-tron S-200 single screw gravimetric feeder with a 2 inch (5.0 cm) operi helix discharge screw. A vibrating tray was used between the feeder and extruder feed opening to dampen out minor rate variations from the feeder.

The feed system for polymer bales consisted of an ARO bale cutter to cut 50 lb (22.7 kg) bales, and a conveyor belt to feed strips of rubber to the extruder. Since reactant feed rates are important for melt reactor or extruder reactions, it was necessary to insure that the copolymer feed systems were set up to deliver the copolymer, as best as possible, at a continuous, constant and uniform rate to meet the targeted polymer feed rate.

The liquid VIMA monomer solution (diluted 1:1 in water) was metered into the extruder with an Eldex Variable Speed Metering Pump capable of delivering fluids at discharge pressures of up to 1500 psig. Rate was adjusted by piston stroke and motor speed, and was monitored by placing the liquid reservoir on a scale. Since reactant feed rates are important for melt reactor or extruder reactions, it was necessary to insure that the monomer feed system was set up to deliver the monomer, as best as possible, at a continuous, constant and uniform rate to meet the targeted monomer feed rate.

The peroxide initiator solutions were also metered with Eldex Variable Speed Metering Pumps capable of delivering fluids at discharge pressures of up to 1500 psig. The rates were adjusted by piston stroke and motor speed, and were monitored by placing the liquid reservoirs on scales. Since reactant feed rates are important for melt reactor or extruder reactions, it was necessary to insure that the initiator feed system was set up to deliver the initiator, as best as possible, at a continuous, constant and uniform rate to meet the targeted initiator feed rate.

D. Vent System

The first vent was located at the end of the reaction zone, and was designed to control vapor pressure in the extruder. This was accomplished by adjusting the air pressure to a pinch valve downstream of the vent stack. A shell and tube condenser and collector was installed after the pinch valve, to trap condensables released in the reaction zone.

The second vent was a vacuum vent separated by a melt seal from the first vent. A Stokes Microvac model 148-10 oil-sealed pump with 50 SCFM capacity was used to pull vacuum. Vapors were condensed in a shell and tube condenser, then stored in a collector. The vacuum level was indicated by a dial gauge.

E. Downstream Equipment

A 10 hole die was used to extrude the melt into a 16 foot (4.9 m) long water bath, where the samples were either cut and collected by hand or pelletized.

F. Materials

The following feed materials were used:
   A. Enichem CO-034 crystalline EP rubber and CO-043 amorphous EP rubber;
   B. Mitsui XLL-10 Amorphous EP rubber;
   C. Mitsui XLM-12 Amorphous EP rubber;
   D. Shell, ShellVis 200 rubber;
   E. 1-vinyl imidazole monomer (VIMA), uninhibited, diluted 1:1 or 1:3 in deionized water;
   F. Di-t-butyl peroxide catalyst (DTBP), diluted 1:4 or 1:9 in PetroCanada HT 160 ('P160 N');
   G. Di-t-butyl peroxide catalyst, diluted 1:4 in Naptha.

Where multiple initiator feed rates are indicated, split feeds (multiple injection ports) were employed. The temperature profiles reported in the examples include five temperature readings. These five temperature readings are, respectively: (a) the barrel set point (excluding heat loss); (b) the first seal; (c) the second seal; (d) the reaction zone; and (e) the vent zone. The following examples delineate parameters useful in the methods of this invention and their products utilizing the equipment and materials described above. Examples 1–2 exemplify comparative examples demonstrating results obtained when the monomer is introduced in the absence of solvent. As can be seen by comparison of Examples 1 and 17 and Examples 2 and 6, the addition of monomer as a solution in water resulted in greatly improved ADT values.

Comparative Example 1

| | |
|---|---|
| Polyolefin | CO-034 |
| Polyolefin Feed Rate (lbs/hr) | 70 (32 kg/hr) |
| Monomer (% w/w:solvent) | VIMA (100%:no water) |
| Monomer Feed Rate (actual lbs/hr monomer) | 1.5 (0.68 kg/hr) |
| Initiator (% w/w:solvent) | DTBP (20% in P160N) |
| Initiator Feed Rate (actual lbs/hr initiator) | 0.2 (0.09 kg/hr) |
| Screw Speed (RPM) | 250 |
| Temperature Profile (° C.) | 185, 260, 260, 250, 259 |
| Monomer on Graft Polymer (%) | 0.56 |
| ADT | 2 |

Comparative Example 2

| | |
|---|---|
| Polyolefin | CO-034 |
| Polyolefin Feed Rate (lbs/hr) | 35 (16 kg/hr) |
| Monomer (% w/w:solvent) | VIMA (100%:no water) |
| Monomer Feed Rate (actual lbs/hr monomer) | 0.72 (0.33 kg/hr) |
| Initiator (% w/w:solvent) | DTBP (20% in P160 N) |
| Initiator Feed Rate (actual lbs/hr initiator) | 0.088 (0.04 kg/hr) |
| Screw Speed (RPM) | 134 |
| Temperature Profile (° C.) | 185, 218, 212, 207, 202 |
| Monomer on Graft Polymer (%) | 1.04 |
| ADT | 2 |

Example 3

| | |
|---|---|
| Polyolefin | CO-034 |
| Polyolefin Feed Rate (lbs/hr) | 35 (16 kg/hr) |
| Monomer (% w/w:solvent) | VIMA (50% in water) |
| Monomer Feed Rate (actual lbs/hr monomer) | 0.38 (0.17 kg/hr) |
| Initiator (% w/w:solvent) | DTBP (20% in Naphtha) |
| Initiator Feed Rate (actual lbs/hr initiator) | 0.1 (0.045 kg/hr) |
| Screw Speed (RPM) | 90 |
| Temperature Profile (° C.) | 185, 218, 206, 192, 201 |
| Monomer on Graft Polymer (%) | 1.46 |
| ADT | 8 |

Example 4

| | |
|---|---|
| Polyolefin | CO-034 |
| Polyolefin Feed Rate (lbs/hr) | 35 (16 kg/hr) |
| Monomer (% w/w:solvent) | VIMA (25% in water) |
| Monomer Feed Rate (actual lbs/hr monomer) | 0.73 (0.33 kg/hr) |
| Initiator (% w/w:solvent) | DTBP (20% in P160 N) |
| Initiator Feed Rate (actual lbs/hr initiator) | 0.2 (0.09 kg/hr) |
| Screw Speed (RPM) | 90 |
| Temperature Profile (° C.) | 185, 220, 201, 187, 202 |
| Monomer on Graft Polymer (%) | 1.63 |
| ADT | 16/8 |

Example 5

| | |
|---|---|
| Polyolefin | CO-034 |
| Polyolefin Feed Rate (lbs/hr) | 35 (16 kg/hr) |
| Monomer (% w/w:solvent) | VIMA (25% in water) |
| Monomer Feed Rate (actual lbs/hr monomer) | 0.99 (0.45 kg/hr) |
| Initiator (% w/w:solvent) | DTBP (20% in P160 N) |
| Initiator Feed Rate (actual lbs/hr initiator) | 0.096 (0.044 kg/hr) |
| Screw Speed (RPM) | 60 |
| Temperature Profile (° C.) | 185, 168, 173, 177, 197 |
| Monomer on Graft Polymer (%) | 2.09 |
| ADT | 4 |

Example 6

| | |
|---|---|
| Polyolefin | CO-034 |
| Polyolefin Feed Rate (lbs/hr) | 35 (16 kg/hr) |
| Monomer (% w/w:solvent) | VIMA (50% in water) |
| Monomer Feed Rate (actual lbs/hr monomer) | 0.74 (0.33 kg/hr) |
| Initiator (% w/w:solvent) | DTBP (20% in P160 N) |
| Initiator Feed Rate (actual lbs/hr initiator) | 0.092 (0.042 kg/hr) |
| Screw Speed (RPM) | 93 |
| Temperature Profile (° C.) | 185, 152, 190, 173, 197 |
| Monomer on Graft Polymer (%) | 2.07 |
| ADT | 16 |

Example 7

| | |
|---|---|
| Polyolefin | CO-034 |
| Polyolefin Feed Rate (lbs/hr) | 53 (24 kg/hr) |
| Monomer (% w/w:solvent) | VIMA (50% in water) |
| Monomer Feed Rate (actual lbs/hr monomer) | 1.11 (0.56 kg/hr) |
| Initiator (% w/w:solvent) | DTBP (20% in P160 N) |
| Initiator Feed Rate (actual lbs/hr initiator) | 0.098; 0.034 (0.045, 0.015 kg/hr) |
| Screw Speed (rpm) | 136 |
| Temperature Profile (° C.) | 185, 173, 202, 220, 212 |
| Monomer on Graft Polymer (%) | 1.74 |
| ADT | 16 |

Example 8

| | |
|---|---|
| Polyolefin | CO-034 |
| Polyolefin Feed Rate (lbs/hr) | 53 (24 kg/hr) |
| Monomer (% w/w:solvent) | VIMA (50% in water) |
| Monomer Feed Rate (actual lbs/hr monomer) | 1.13 (0.57 kg/hr) |
| Initiator (% w/w:solvent) | DTBP (20% in P160 N) |
| Initiator Feed Rate (actual lbs/hr initiator) | 0.15 (0.066 kg/hr) |
| Screw Speed (RPM) | 137 |
| Temperature Profile (° C.) | 185, 176, 204, 205, 211 |
| Monomer on Graft Polymer (%) | 1.26 |
| ADT | 16 |

Example 9

| | |
|---|---|
| Polyolefin | CO-034 |
| Polyolefin Feed Rate (lbs/hr) | 70 (32 kg/hr) |
| Monomer (% w/w:solvent) | VIMA (50% in water) |
| Monomer Feed Rate (actual lbs/hr monomer) | 1.46 (0.66 kg/br) |
| Initiator (% w/w:solvent) | DTBP (20% in P160 N) |
| Initiator Feed Rate (actual lbs/hr initiator) | 0.206; 0.098 (0.094, 0.045 kg/hr) |
| Screw Speed (RPM) | 180 |
| Temperature Profile (° C.) | 185, 182, 212, 219, 234 |
| Monomer on Graft Polymer (%) | 1.37 |
| ADT | 8 |

Example 10

| | |
|---|---|
| Polyolefin | CO-034 |
| Polyolefin Feed Rate (lbs/hr) | 53 (24 kg/hr) |
| Monomer (% w/w:solvent) | VIMA (50% in water) |
| Monomer Feed Rate (actual lbs/hr monomer) | 0.58 (0.26 kg/hr) |
| Initiator (% w/w:solvent) | DTBP (20% in P160 N) |
| Initiator Feed Rate (actual lbs/hr initiator) | 0.064; 0.054 (0.029, 0.025 kg/hr) |
| Screw Speed (RPM) | 137 |
| Temperature Profile (° C.) | 185, 167, 205, 203, 222 |
| Monomer on Graft Polymer (%) | 1.1 |
| ADT | 16 |

Example 11

| | |
|---|---|
| Polyolefin | CO-034 |
| Polyolefin Feed Rate (lbs/hr) | 53 (24 kg/hr) |
| Monomer (% w/w:solvent) | VIMA (50% in water) |
| Monomer Feed Rate (actual lbs/hr monomer) | 0.99 (0.45 kg/hr) |
| Initiator (% w/w:solvent) | DTBP (20% in P160 N) |
| Initiator Feed Rate (actual lbs/hr initiator) | 0.082; 0.076 (0.037, 0.035 kg/hr) |
| Screw Speed (RPM) | 136 |
| Temperature Profile (° C.) | 185, 173, 210, 206, 221 |
| Monomer on Graft Polymer (%) | 1.5 |
| ADT | 16 |

Example 12

| | |
|---|---|
| Polyolefin | CO-034 |
| Polyolefin Feed Rate (lbs/hr) | 53 (24 kg/hr) |
| Monomer (% w/w:solvent) | VIMA (50% in water) |
| Monomer Feed Rate (actual lbs/hr monomer) | 0.65 (0.3 kg/hr) |
| Initiator (% w/w:solvent) | DTBP (10% in P160 N) |
| Initiator Feed Rate (actual lbs/hr initiator) | 0.05; 0.049; 0.049 (0.023, 0.023, 0.023 kg/hr) |
| Screw Speed (RPM) | 140 |
| Temperature Profile (° C.) | 185, 162, 235, 231, 239 |
| Monomer on Graft Polymer (%) | 1.58 |
| ADT | 16 |

Example 13

| | |
|---|---|
| Polyolefin | XLL-10 |
| Polyolefin Feed Rate (lbs/hr) | 43 (20 kg/hr) |
| Monomer (% w/w:solvent) | VIMA (50% in water) |
| Monomer Feed Rate (actual lbs/hr monomer) | 0.76 (0.35 kg/hr) |
| Initiator (% w/w:solvent) | DTBP (20% in P160 N) |
| Initiator Feed Rate (actual lbs/hr initiator) | 0.15; 0.15 (0.068, 0.068 kg/hr) |
| Screw Speed (RPM) | 136 |
| Temperature Profile (° C.) | 205, 162, 181, 198, 210 |
| Monomer on Graft Polymer (%) | 0.81 |
| ADT | 8 |

Example 14

| | |
|---|---|
| Polyolefin | XLL-10 |
| Polyolefin Feed Rate (lbs/hr) | 68 (24 kg/hr) |

-continued

| | |
|---|---|
| Monomer (% w/w:solvent) | VIMA (50% in water) |
| Monomer Feed Rate (actual lbs/hr monomer) | 1.53 (0.7 kg/hr) |
| Initiator (% w/w:solvent) | DTBP (20% in P160 N) |
| Initiator Feed Rate (actual lbs/hr initiator) | 0.2; 0.2 |
| | (0.091, 0.091 kg/hr) |
| Screw Speed (RPM) | 276 |
| Temperature Profile (° C.) | 205, 161, 191, 210, 229 |
| Monomer on Graft Polymer (%) | 1.35 |
| ADT | 8 |

Example 15

| | |
|---|---|
| Polyolefin | XLL-10 |
| Polyolefin Feed Rate (lbs/hr) | 73 (33 kg/hr) |
| Monomer (% w/w:solvent) | VIMA (50% in water) |
| Monomer Feed Rate (actual lbs/hr monomer) | 1.5 (0.68 kg/hr) |
| Initiator (% w/w:solvent) | DTBP (20% in P160 N) |
| Initiator Feed Rate (actual lbs/hr initiator) | 0.34, 0.27 |
| | (0.15, 0.12 kg/hr) |
| Screw Speed (RPM) | 274 |
| Temperature Profile (° C.) | 205, 156, 192, 212, 230 |
| Monomer on Graft Polymer (%) | 1.48 |
| ADT | 8 |

Example 16

| | |
|---|---|
| Polyolefin | CO-034 |
| Polyolefin Feed Rate (lbs/br) | 48 (22 kg/hr) |
| Monomer (% w/w:solvent) | VIMA (50% in water) |
| Monomer Feed Rate (actual lbs/hr monomer) | 0.58 (0.26 kg/hr) |
| Initiator (% w/w:solvent) | DTBP (20% in P160 N) |
| Initiator Feed Rate (actual lbs/hr initiator) | 0.048; 0.042; 0.046 |
| | (0.022, 0.019, 0.021 kg/hr) |
| Screw Speed (RPM) | 137 |
| Temperature Profile (° C.) | 185, 200, 244, 218, 247 |
| Monomer on Graft Polymer (%) | 1.52 |
| ADT | 16 |

Example 17

| | |
|---|---|
| Polyolefin | CO-034 |
| Polyolefin Feed Rate (lbs/hr) | 70 (32 kg/hr) |
| Monomer (% w/w:solvent) | VIMA (50% in water) |
| Monomer Feed Rate (actual lbs/hr monomer) | 0.75 (0.34 kg/hr) |
| Initiator (% w/w:solvent) | DIBP (20% in P160 N) |
| Initiator Feed Rate (actual lbs/hr initiator) | 0.19 |
| | (0.086 kg/hr) |
| Screw Speed (rpm) | 180 |
| Temperature Profile (° C.) | 185, 177, 211, 229, 229 |
| Monomer on Graft Polymer (%) | 0.82 |
| ADT | 8 |

Example 18

| | |
|---|---|
| Polyolefin | XLM-12 |
| Polyolefin Feed Rate (lbs/hr) | 61 (28 kg/hr) |
| Monomer (% w/w:solvent) | VIMA (50% in water) |
| Monomer Feed Rate (actual lbs/hr monomer) | 0.74 (0.34 kg/hr) |
| Initiator (% w/w:solvent) | DTBP (20% in P160 N) |

-continued

| | |
|---|---|
| Initiator Feed Rate (actual lbs/hr initiator) | 0.15; 0.15 |
| | (0.068, 0.068 kg/hr) |
| Screw Speed (rpm) | 138 |
| Temperature Profile (° C.) | 205, 172, 204, 203, 222 |
| Monomer on Graft Polymer (%) | 1.13 |
| ADT | 8 |

Example 19

| | |
|---|---|
| Polyolefin | XLM-12 |
| Polyolefin Feed Rate (lbs/hr) | 63 (29 kg/hr) |
| Monomer (% w/w:solvent) | VIMA (50% in water) |
| Monomer Feed Rate (actual lbs/hr monomer) | 1.26 (0.57 kg/hr) |
| Initiator (% w/w:solvent) | DTBP (20% in P160 N) |
| Initiator Feed Rate (actual lbs/hr initiator) | 0.25; 0.26 |
| | (0.11, 0.12 kg/hr) |
| Screw Speed (RPM) | 225 |
| Temperature Profile (° C.) | 205, 190, 221, 212, 233 |
| Monomer on Graft Polymer (%) | 1.33 |
| ADT | 8 |

Example 20

| | |
|---|---|
| Polyolefin | XLM-12 |
| Polyolefin Feed Rate (lbs/hr) | 154 (70 kg/hr) |
| Monomer (% w/w:solvent) | VIMA (50% in water) |
| Monomer Feed Rate (actual lbs/hr monomer) | 2.13 (0.97 kg/hr) |
| Initiator (% w/w:solvent) | DTBP (20% in P160N) |
| Initiator Feed Rate (actual lbs/hr initiator) | 0.26, 0.29 |
| | (0.12, 0.13 kg/hr) |
| Screw Speed (rpm) | 222 |
| Temperature Profile (° C.) | 205, 182, 212, 223, 245 |
| Monomer on Graft Polymer (%) | 0.95 |
| ADT | 8 |

Example 21

| | |
|---|---|
| Polyolefin | CO-043 |
| Polyolefin Feed Rate (lbs/hr) | 136 (62 kg/hr) |
| Monomer (% w/w:solvent) | VIMA (50% in water) |
| Monomer Feed Rate (actual lbs/hr monomer) | 1.5 (0.68 kg/hr) |
| Initiator (% w/w:solvent) | DTBP (20% in P160N) |
| Initiator Feed Rate (actual lbs/hr initiator) | 0.25 (0.11 kg/hr) |
| Screw Speed (RPM) | 199 |
| Temperature Profile (° C.) | 185, 204, 223, 231, 245 |
| Monomer on Graft Polymer (%) | 0.89 |
| ADT | 16 |

Example 22

| | |
|---|---|
| Polyolefin | CO-043 |
| Polyolefin Feed Rate (lbs/hr) | 145 (66 kg/hr) |
| Monomer (% w/w:solvent) | VIMA (50% in water) |
| Monomer Feed Rate (actual lbs/hr monomer) | 2.53 (1.15 kg/hr) |
| Initiator (% w/w:solvent) | DTBP (20% in Naptha) |
| Initiator Feed Rate (actual lbs/hr initiator) | 0.5 (0.23 kg/hr) |
| Screw Speed (rpm) | 280 |

-continued

| | |
|---|---|
| Temperature Profile (° C.) | 185, 210, 236, 239, 261 |
| Monomer on Graft Polymer (%) | 1.37 |
| ADT | 16 |

Example 23

| | |
|---|---|
| Polyolefin | CO-043 |
| Polyolefin Feed Rate (lbs/hr) | 173 (79 kg/hr) |
| Monomer (% w/w:solvent) | VIMA (50% in water) |
| Monomer Feed Rate (actual lbs/hr monomer) | 2.5 (1.14 kg/hr) |
| Initiator (% w/w:solvent) | DTBP (20% in Naptha) |
| Initiator Feed Rate (actual lbs/hr initiator) | 0.77 (0.35 kg/hr) |
| Screw Speed (RPM) | 253 |
| Temperature Profile (° C.) | 185, 206, 229, 237, 256 |
| Monomer on Graft Polymer (%) | 1.08 |
| ADT | 16 |

While we have described a number of embodiments of this invention, the selection and proportions of ingredients, process conditions, and other factors may be altered to provide other embodiments which do not depart from the basic teachings disclosed herein. Modifications and improvements may be made to the embodiments specifically disclosed in this application, yet these modifications and improvements are within the scope and spirit of the invention as set forth in the claims which follow.

What is claimed is:

1. A method of making a graft copolymer, comprising the steps of:
   (a) introducing an ethylene/propylene (EP) copolymer or other graftable polymer into a screw extruder having injection ports and a barrel;
   (b) introducing into said extruder separately from said copolymer or other graftable polymer an ethylenically unsaturated monomer which is at least one selected from the group consisting of monomers containing one or more of the following: sulfur, nitrogen and oxygen, into the extruder as a mixture with a polar solvent such that the concentration of monomer in the mixture is 5–95% w/w;
   (c) introducing into the extruder an amount of an initiator sufficient to graft said monomer and EP copolymer or other graftable polymer; and
   (d) reacting said EP copolymer or other graftable polymer, said ethylenically unsaturated monomer and said initiator by operating said extruder thereby forming the graft copolymer in which more than one port is used along the extruder barrel.

2. A method as claimed in claim 1, wherein said monomer is at least one selected from the group consisting of N-vinylimidazole, 1-vinyl-2-pyrrolidinone, C-vinylimidazole, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cylohexyl-N-allyl formamide, 4-methyl-S-vinyl thiazole, N-allyl diisooctyl phenothiazine, 2-methyl-1-vinylimidazole, 3-methyl-1-vinylpyrazole, N-vinylpurine, N-vinylpiperazines, N-vinylsuccinimide, vinylpiperidines, maleic anhydride, maleic acid, acrylic acid, and vinylmorpholines.

3. A method as claimed in claim 1 or 2, wherein the graftable polymer is at least one selected from the group consisting of amorphous and crystalline, partially hydrogenated and hydrogenated polymers of ethylene, propylene, isoprene, styrene, butadiene, butene, hexene, hexadiene, and octene.

4. A method as claimed in claim 1 or 2, wherein the graftable polymer is at least one selected from the group consisting of ethylene/propylene copolymer, linear or star polyisoprene, polyisobutylene, and ethylene/propylene/diene terpolymer.

5. A method of making a graft copolymer, comprising the steps of:
   (a) introducing an ethylene/propylene (EP) copolymer or other graftable polymer into a screw extruder having injection ports and a barrel;
   (b) introducing into said extruder separately from said copolymer or other graftable polymer an ethylenically unsaturated monomer which is at least one selected from the group consisting of monomers containing one or more of the following: sulfur, nitrogen and oxygen, into the extruder as a mixture with a polar solvent such that the concentration of monomer in the mixture is 5–95% w/w;
   (c) introducing into the extruder an amount of an initiator sufficient to graft said monomer and EP copolymer or other graftable polymer; and
   (d) reacting said EP copolymer or other graftable polymer, said ethylenically unsaturated monomer and said initiator by operating said extruder thereby forming the graft copolymer in which more of the ingredients are injected into different ports.

6. A method as claimed in claim 5, wherein said monomer is at least one selected from the group consisting of N-vinylimidazole, 1-vinyl-2-pyrrolidinone, C-vinylimidazole, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-S-vinyl thiazole, N-allyl diisooctyl phenothiazine, 2-methyl-1-vinylimidazole, 3-methyl-1-vinylpyrazole, N-vinylpurine, N-vinylpiperazines, N-vinylsuccinimide, vinylpiperidines, maleic anhydride, maleic acid, acrylic acid, and vinylmorpholines.

7. A method as claimed in claim 5 or 6, wherein the graftable polymer is at least one selected from the group consisting of amorphous and crystalline, partially hydrogenated and hydrogenated polymers of ethylene, propylene, isoprene, styrene, butadiene, butene, hexene, hexadiene, and octene.

8. A method as claimed in claim 5 or 6, wherein the graftable polymer is at least one selected from the group consisting of ethylene/propylene copolymer, linear or star polyisoprene, polyisobutylene, and ethylene/propylene/diene terpolymer.

9. A method of making a graft copolymer, comprising the steps of:
   (a) introducing an ethylene/propylene (EP) copolymer or other graftable polymer into a screw extruder;
   (b) introducing into said extruder separately from said copolymer or other graftable polymer an ethylenically unsaturated monomer which is at least one selected from the group consisting of monomers containing one or more of the following: sulfur, nitrogen and oxygen, into the extruder as a mixture with a polar solvent such that the concentration of monomer in the mixture is 5–95% w/w;
   (c) introducing into the extruder an amount of an initiator sufficient to graft said monomer and EP copolymer or other graftable polymer; and (d) reacting said EP copolymer or other graftable polymer, said ethylenically unsaturated monomer and said initiator by operating said extruder thereby forming the graft copolymer in which the monomer is introduced in several discrete charges.

10. A method as claimed in claim 9, wherein said monomer is at least one selected from the group consisting of N-vinylimidazole, 1-vinyl-2-pyrrolidinone, C-vinylimidazole, N-allylimidazole, 1-vinylpyrrolidinone, 2-vinylpyridine, 4-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-S-vinyl thiazole, N-allyl diisooctyl phenothiazine, 2-methyl-1-vinylimidazole, 3-methyl-1-vinylpyrazole, N-vinylpurine, N-vinylpiperazines, N-vinylsuccinimide, vinylpiperidines, maleic anhydride, maleic acid, acrylic acid, and vinylmorpholines.

11. A method as claimed in claim 9 or 10, wherein the graftable polymer is at least one selected from the group consisting of amorphous and crystalline, partially hydrogenated and hydrogenated polymers of ethylene, propylene, isoprene, styrene, butadiene, butene, hexene, hexadiene, and octene.

12. A method as claimed in claim 9 or 10, wherein the graftable polymer is at least one selected from the group consisting of ethylene/propylene copolymer, linear or star polyisoprene, polyisobutylene, and ethylene/propylene/diene terpolymer.

13. A method as in claim 1, 2, 5, 6, 9 or 10, wherein the graftable polymer is at least one selected from the group consisting of co-polymers and terpolymers of ethylene, propylene, isoprene, butene, hexene and octene.

* * * * *

UNITED STATES PATENT AND TRADEMARK OFFICE
CERTIFICATE OF CORRECTION

PATENT NO. : 6,723,796 B2 Page 1 of 1
APPLICATION NO. : 10/093517
DATED : April 30, 2004
INVENTOR(S) : Goldblatt et al.

It is certified that error appears in the above-identified patent and that said Letters Patent is hereby corrected as shown below:

Column 24, line 28, change "more of the" to -- different --

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,723,796 B2　　　　　　　　　　　　　　　　　　　　　　　Page 1 of 1
APPLICATION NO. : 10/093517
DATED : April 20, 2004
INVENTOR(S) : Goldblatt et al.

It is certified that error appears in the above-identified patent and that said Letters Patent is hereby corrected as shown below:

Column 24, line 28, change "more of the" to -- different --

This certificate supersedes Certificate of Correction issued August 29, 2006.

Signed and Sealed this

Seventh Day of November, 2006

JON W. DUDAS
*Director of the United States Patent and Trademark Office*